(12) United States Patent
Zhang (10) Patent No.: US 11,320,698 B2
(45) Date of Patent: May 3, 2022

(54) BACKLIGHT STRUCTURE, LIQUID CRYSTAL DISPLAY PANEL AND ELECTRONIC DEVICE

(71) Applicant: WUHAN CHINA STAR OPTOELECTRONICS TECHNOLOGY CO., LTD., Hubei (CN)

(72) Inventor: Bingchuan Zhang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 309 days.

(21) Appl. No.: 16/605,705

(22) PCT Filed: Sep. 17, 2019

(86) PCT No.: PCT/CN2019/106066
§ 371 (c)(1),
(2) Date: Oct. 16, 2019

(87) PCT Pub. No.: WO2020/192036
PCT Pub. Date: Oct. 1, 2020

(65) Prior Publication Data
US 2021/0356814 A1    Nov. 18, 2021

(30) Foreign Application Priority Data
Mar. 28, 2019 (CN) .......................... 201910243547.7

(51) Int. Cl.
*G02F 1/13357* (2006.01)

(52) U.S. Cl.
CPC .. *G02F 1/133608* (2013.01); *G02F 1/133603* (2013.01); *G02F 1/133615* (2013.01)

(58) Field of Classification Search
CPC ......... G02F 1/133608; G02F 1/133603; G02F 1/133615
See application file for complete search history.

(56) References Cited

U.S. PATENT DOCUMENTS

| | | | |
|---|---|---|---|
| 10,049,627 B2 * | 8/2018 | Schuck | ................ G09G 3/3648 |
| 10,852,582 B2 * | 12/2020 | Zhu | ........................ H05K 1/118 |
| 11,003,208 B2 * | 5/2021 | Hendren | ........... G02F 1/133603 |
| 11,086,157 B1 * | 8/2021 | Zhou | ................ G02F 1/133331 |
| 2010/0027291 A1 | 2/2010 | Hamada | |
| 2018/0348422 A1 | 12/2018 | Ohto | |

(Continued)

FOREIGN PATENT DOCUMENTS

| | | |
|---|---|---|
| CN | 201053602 Y | 4/2008 |
| CN | 101526185 A | 9/2009 |
| CN | 101611262 A | 12/2009 |

(Continued)

*Primary Examiner* — Tracie Y Green (57) ABSTRACT

A backlight structure, a liquid crystal display (LCD) panel and an electronic device. The backlight structure includes a backboard, a plurality of bonding units spaced apart on the backboard, a plurality of light sources fixed to the backboard by the plurality of bonding units, wherein an area of a projection of a contact surface between the light sources and the bonding units on the backplane is less than or equal to an area of a projection of the light sources on the backboard.

17 Claims, 4 Drawing Sheets

(56) References Cited

U.S. PATENT DOCUMENTS

2021/0356814 A1   11/2021   Zhang

FOREIGN PATENT DOCUMENTS

| | | |
|---|---|---|
| CN | 203641991 U | 6/2014 |
| CN | 203880505 U | 10/2014 |
| CN | 204756803 U | 11/2015 |
| CN | 204807879 U | 11/2015 |
| CN | 105892147 A | 8/2016 |
| CN | 206920781 U | 1/2018 |
| CN | 207882627 U | 9/2018 |
| CN | 108980684 A | 12/2018 |
| CN | 110045541 A | 7/2019 |
| KR | 20120003309 A | 1/2012 |

* cited by examiner

BACKLIGHT STRUCTURE, LIQUID CRYSTAL DISPLAY PANEL AND ELECTRONIC DEVICE

CROSS REFERENCE TO RELATED APPLICATION

This application claims the priority of International Application No. PCT/CN2019/106066, filed on 2019 Sep. 17, which claims priority to Chinese Application No. 201910243547.7, filed on 2019 Mar. 28. The entire disclosures of each of the above applications are incorporated herein by reference.

BACKGROUND OF INVENTION

Field of Invention

The present invention relates to the field of display technologies, and in particular, to a backlight structure, a liquid crystal display (LCD) panel and an electronic device.

Description of Prior Art

Backlight structures of liquid crystal display (LCD) panels in the prior art are fully sealed structures, and light emitting diodes (LED) as light sources are sealed in a small space. This structure causes a heat generated by the light sources to be collected inside the backlight structure, thereby the heat dissipation efficiency of the backlight structure is low.

Technical Problems

Figure 1:
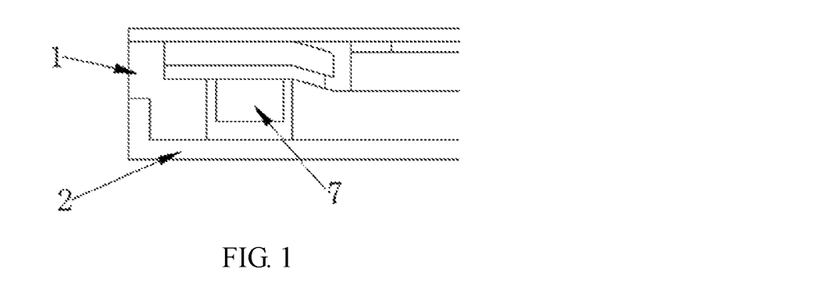
FIG. 1 is a structural diagram of a backlight structure of a liquid crystal panel (LCD) in the prior art.
Figure 2:
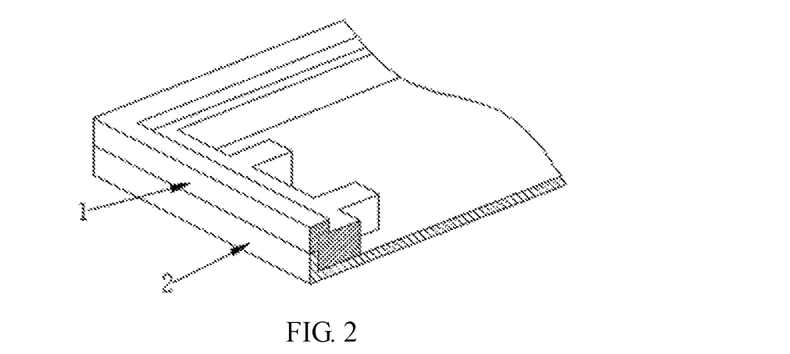
FIG. 2 is a perspective diagram of a backlight structure of a liquid crystal panel in the prior art.

Referring to FIG. 1 and FIG. 2, a light source 7 is fixed on a backboard 2 by a sealant 1. Because the light source 7 is fixed in a sealed space composed by the sealant 1 and the backboard 2, a heat generated during operation is difficult to diverge. As a result, a temperature of the backboard 2 rises too fast, which affects the working performance of the liquid crystal Display (LCD) panel.

Therefore, it is necessary to propose a new type of backlight structure with high heat dissipation efficiency.

SUMMARY OF INVENTION

The present invention provides a backlight structure, a liquid crystal display (LCD) panel and an electronic device to improve the heat dissipation efficiency of the backlight structure.

To solve to above problems, the present invention provides a backlight structure, wherein the backlight structure comprises:

a backboard;

a plurality of bonding units spaced apart on the backboard;

a plurality of light sources fixed to the backboard by the plurality of bonding units;

wherein an area of a projection of a contact surface between the light sources and the bonding units on the backplane is less than or equal to an area of a projection of the light sources on the backboard.

According to one aspect of the present invention, wherein the bonding units are consisted of a plurality of strip-shaped adhesive tapes;

wherein the plurality of strip-shaped adhesive tapes are arranged in parallel, a length direction of the plurality of strip-shaped adhesive tapes is parallel to an edge of the backboard, and a length of the plurality of strip-shaped adhesive tapes is less than or equal to a length of the edge.

According to one aspect of the present invention, wherein distances between any two adjacent strip-shaped adhesive tapes are equal, and the distance between any two adjacent strip-shaped adhesive tapes is greater than a width of the strip-shaped adhesive tape.

According to one aspect of the present invention, wherein the light sources are consisted of a plurality of light strips disposed in parallel, each of the light strips comprising a plurality of independent point light sources.

According to one aspect of the present invention, wherein the light strips have a same structure and size, and are disposed in one-to-one correspondence with the strip-shaped adhesive tapes, wherein a length of the light strips is less than or equal to a length of the strip-shaped adhesive tapes, and a minimum width of the point light sources of each of the light strips is greater than the width of the strip-shaped adhesive tape.

According to one aspect of the present invention, wherein the bonding units are consisted of a plurality of independent bonding points, the light sources are consisted of a plurality of independent point light sources, the plurality of bonding points and the plurality of point light sources are in one-to-one correspondence.

According to one aspect of the present invention, wherein an area of a projection of the bonding point corresponding to a point light source on the backboard is less than or equal to an area of a projection of the point light source on the backboard.

According to one aspect of the present invention, wherein the point light sources are evenly distributed on the backboard;

wherein a distance between geometric centers of any two adjacent point light sources is equal.

The present invention further provides a LCD panel comprising a backlight structure, wherein the backlight structure comprises:

a backboard;

a plurality of bonding units spaced apart on the backboard;

a plurality of light sources fixed to the backboard by the plurality of bonding units;

wherein an area of a projection of a contact surface between the light sources and the bonding units on the backplane is less than or equal to an area of a projection of the light sources on the backboard.

According to one aspect of the present invention, wherein the bonding units are consisted of a plurality of strip-shaped adhesive tapes;

wherein the plurality of strip-shaped adhesive tapes are arranged in parallel, a length direction of the plurality of strip-shaped adhesive tapes is parallel to an edge of the backboard, and a length of the plurality of strip-shaped adhesive tapes is less than or equal to a length of the edge.

According to one aspect of the present invention, wherein distances between any two adjacent strip-shaped adhesive tapes are equal, and the distance between any two adjacent strip-shaped adhesive tapes is greater than a width of the strip-shaped adhesive tape.

According to one aspect of the present invention, wherein the light sources are consisted of a plurality of light strips disposed in parallel, each of the light strips comprising a plurality of independent point light sources.

According to one aspect of the present invention, wherein the light strips have a same structure and size, and are disposed in one-to-one correspondence with the strip-shaped adhesive tapes, wherein a length of the light strips is less than or equal to a length of the strip-shaped adhesive tapes, and a minimum width of the point light sources of each of the light strips is greater than the width of the strip-shaped adhesive tape.

According to one aspect of the present invention, wherein the bonding units are consisted of a plurality of independent bonding points, the light sources are consisted of a plurality of independent point light sources, the plurality of bonding points and the plurality of point light sources are in one-to-one correspondence.

According to one aspect of the present invention, wherein an area of a projection of the bonding point corresponding to a point light source on the backboard is less than or equal to an area of a projection of the point light source on the backboard.

According to one aspect of the present invention, wherein the point light sources are evenly distributed on the backboard;

wherein a distance between geometric centers of any two adjacent point light sources is equal.

The present invention further provides an electronic device comprising a liquid crystal display (LCD) panel, wherein the LCD panel comprises a backlight structure, and the backlight structure comprises:

a backboard;

a plurality of bonding units spaced apart on the backboard;

a plurality of light sources fixed to the backboard by the plurality of bonding units;

wherein an area of a projection of a contact surface between the light sources and the bonding units on the backplane is less than or equal to an area of a projection of the light sources on the backboard.

Beneficial Effects

The invention provides a backlight structure using a plurality of independently arranged bonding units instead of the bonding unit integrally provided in the prior art, so that gaps for air circulation exist between the plurality of light sources connected by the bonding units. The exchange of internal heat with the external environment promotes the heat dissipation rate of the internal light sources of the backlight structure. Meanwhile, the bonding units in the present invention covers only part of the surface of the light sources. Compared with the situation in which the bonding units in the prior art completely covers the light sources, the present invention further increases the heat dissipation area of the light sources and improves the heat dissipation efficiency of the backlight structure.

DETAILED DESCRIPTION OF PREFERRED EMBODIMENTS

Description of following embodiment, with reference to accompanying drawings, is used to exemplify specific embodiments which may be carried out in the present disclosure. Directional terms mentioned in the present disclosure, such as "top", "bottom", "front", "back", "left", "right", "inside", "outside", "side", etc., are only used with reference to orientation of the accompanying drawings. Therefore, the directional terms are intended to illustrate, but not to limit, the present disclosure. In the drawings, components having similar structures are denoted by same numerals.

First, the prior art is briefly explained. Referring to FIG. 1 and FIG. 2, FIG. 1 is a structural diagram of a backlight structure of a liquid crystal panel (LCD) in the prior art. FIG. 2 is a perspective diagram of a backlight structure of a liquid crystal panel in the prior art. Backlight structures of LCD panels in the prior art are fully sealed structures, and light emitting diodes (LED) as light sources are sealed in a small space. This structure causes a heat generated by the light sources to be collected inside the backlight structure, thereby the heat dissipation efficiency of the backlight structure is low. Referring to FIG. 1 and FIG. 2, a light source 7 is fixed on a backboard 2 by a sealant 1. Because the light source 7 is fixed in a sealed space composed by the sealant 1 and the backboard 2, a heat generated during operation is difficult to diverge. As a result, a temperature of the backboard 2 rises too fast, which affects the working performance of the LCD panel.

Figure 3:
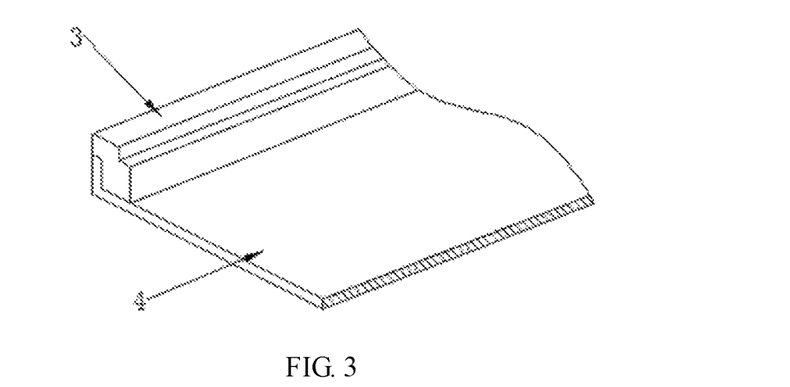
FIG. 3 is a perspective diagram of a backboard of a backlight structure in an embodiment of the present invention.
Figure 4:
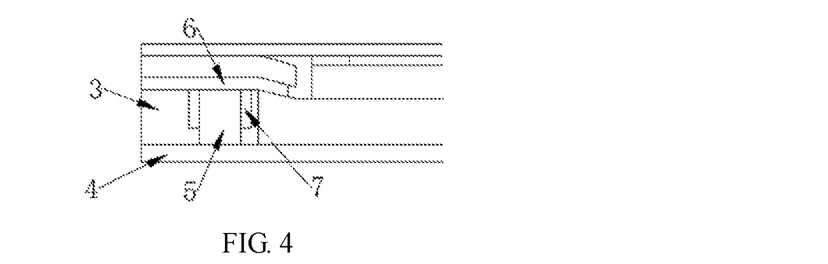
FIG. 4 is a structural diagram of a backlight structure in an embodiment of the present invention.
Figure 5:
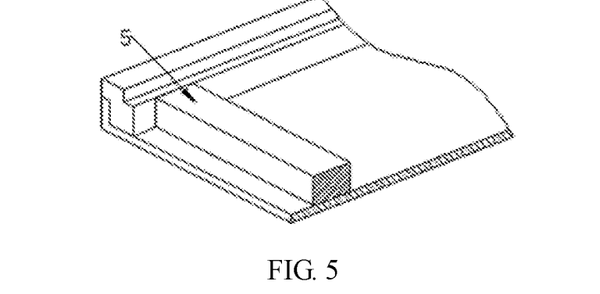
FIG. 5 is a perspective diagram of a backboard and bonding units in the backlight structure of FIG. 4.
Figure 6:
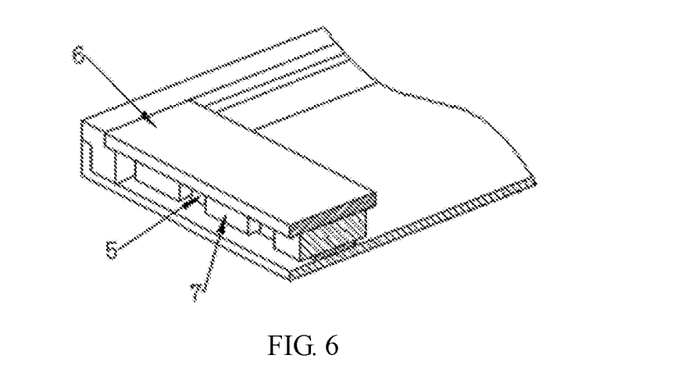
FIG. 6 is a perspective diagram of a backboard, bonding units, and light sources in the backlight structure of FIG. 4.
Figure 7:
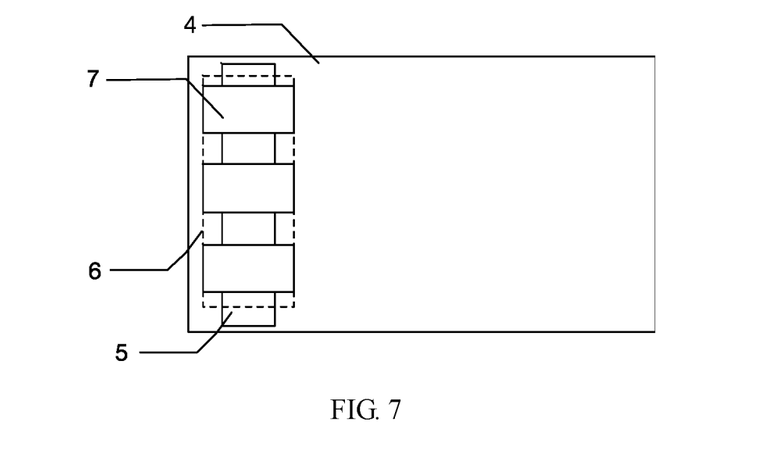
FIG. 7 is a diagram of a projection of the structure of FIG. 6 on a horizontal plane.

Therefore, the present invention provides a backlight structure, a LCD penal and an electronic device to improve the heat dissipation efficiency of the backlight structure. Referring to FIG. 3 to FIG. 7, FIG. 3 is a perspective diagram of a backboard of a backlight structure in an embodiment of the present invention. FIG. 4 is a structural diagram of a backlight structure in an embodiment of the present invention. FIG. 5 is a perspective diagram of a backboard and bonding units in the backlight structure of FIG. 4. FIG. 6 is a perspective diagram of a backboard, bonding units, and light sources in the backlight structure of FIG. 4. FIG. 7 is a diagram of a projection of the structure of FIG. 6 on a horizontal plane.

The backlight structure of the present invention includes a backboard, a plurality of bonding units and a plurality of light sources.

In this embodiment, the backboard 4 is a flat plate structure instead of a groove structure in the prior art. Grooved backboards in the prior art typically include a bottom panel and side support plates surrounding the bottom panel. The side support plates can enhance the stability of the backboard, and also hinder the air circulation inside the backlight structure, resulting in heat accumulation inside the backlight structure, and decreasing the heat dissipation efficiency of the backlight structure. The backboard with a flat plate structure is a good way to avoid this problem. Because the side support plates are removed, the light sources and the bonding units in the backlight structure in the present embodiment can directly exchange heat with the outside, and the heat dissipation efficiency of the entire backlight structure is remarkably improved. Typically, a shape of the backboard is rectangular or circular, and the backboard can take any other geometric shape. Display panels in the prior art is mostly rectangular, in the present embodiment, a rectangular backboard is taken as an example for description.

Referring to FIG. 3, in the embodiment, the backboard is a rectangular flat plate structure, and one side of the flat plate structure has a vertical support portion perpendicular to the flat plate structure. The vertical support portion is for supporting an optical film layers disposed above the backboard. The shape of the bonding units is easily changed by the effects of external factors, if the optical film layers above the backboard is supported only by the bonding units, a light mixing distance between the optical film layer and the light sources cannot keep constant. A change in the light mixing distance can result in an uneven brightness and affect the display effect. The vertical support portion in this embodiment is only disposed on one side of the flat plate structure, so that the support strength of the backboard can be enhanced. At the same time, the connection between the backlight structure and the external environment is not affected and the heat dissipation efficiency of the backlight structure is not affected.

Therefore, preferably, a support structure is provided on the backboard. The support structure can be disposed on a side of the backboard as shown in FIG. 3, perpendicular to the backboard. At this time, the support structure covers only a part of the side edges of the backboard. The support structure can also be support columns evenly distributed between the light sources of the backboard. In practice, a suitable support structure can be selected as needed.

Figure 8:
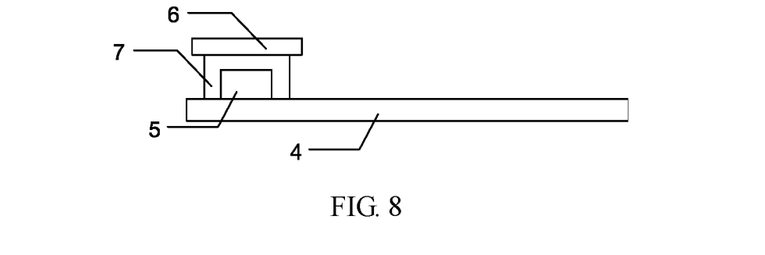
FIG. 8 is a cross-sectional view of the structure of FIG. 6 in a vertical direction.

Referring to FIG. 4 to FIG. 8, FIG. 4 is a structural diagram of a backlight structure in an embodiment of the present invention. FIG. 5 is a perspective diagram of a backboard and bonding units in the backlight structure of FIG. 4. FIG. 6 is a perspective diagram of a backboard, bonding units, and light sources in the backlight structure of FIG. 4. FIG. 7 is a diagram of a projection of the structure of FIG. 6 on a horizontal plane. FIG. 8 is a cross-sectional view of the structure of FIG. 6 in a vertical direction. In the present embodiment, in order to clearly show the relationship between the backboard, the bonding units, and the light sources, the number of the bonding units 5 and the number of the light sources in the above-described drawings are one.

Figure 9:
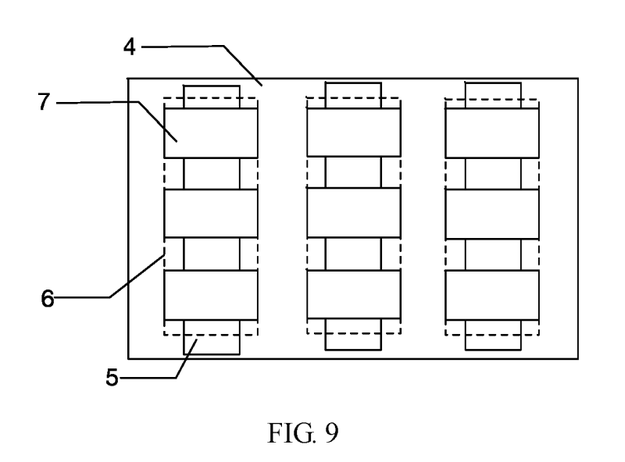
FIG. 9 is a diagram of a projection of a backlight structure on a horizontal plane in another embodiment of the present invention.
Figure 10:
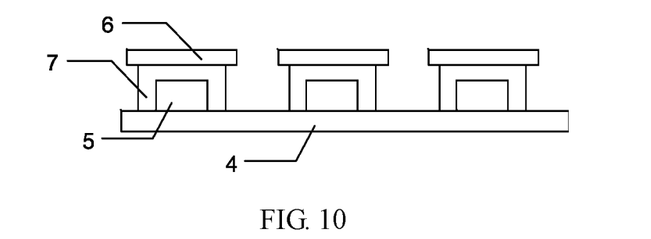
FIG. 10 is a cross-sectional view of the backlight structure of FIG. 9 in a vertical direction.

In order to achieve a uniform light mixing effect, generally, the light sources are uniformly distributed on the backboard 4, as showing in FIG. 9 and FIG. 10. FIG. 9 is a diagram of a projection of a backlight structure on a horizontal plane in another embodiment of the present invention. FIG. 10 is a cross-sectional view of the backlight structure of FIG. 9 in a vertical direction.

In order to achieve a uniform light mixing effect, generally, the light sources are uniformly distributed on the backboard 4, referring to FIG. 9 and FIG. 10. FIG. 9 is a diagram of a projection of a backlight structure on a horizontal plane in another embodiment of the present invention. FIG. 10 is a cross-sectional view of the backlight structure of FIG. 9 in a vertical direction.

In this embodiment, the bonding units are a plurality of strip-shaped adhesive tapes 5. Specifically, the number of the strip-shaped adhesive tapes 5 is three. The strip-shaped adhesive tape 5 is composed of a thermosetting adhesive material or a photo-curable adhesive material. Preferably, the strip-shaped adhesive tapes 5 are made of a thermosetting adhesive material, such as room temperature vulcanized silicone rubber (RTV). RTV is a flowable colloid with adjustable viscosity at room temperature, and its shape can be changed under the action of external force. The light sources are disposed in the RTV in room temperature so that relative positions of the light sources and the bonding units can be easily adjusted. Then heating is performed to cure the RTV to attach the light sources to the backboard. In other embodiments, the thermosetting bonding material can also be epoxy resins, phenolic resins, polyurethanes, acrylates, and the like.

Preferably, as shown in FIG. 8, the plurality of strip-shaped adhesive tapes 5 are arranged in parallel, a length direction of the plurality of strip-shaped adhesive tapes 5 is parallel to an edge of the backboard, and a length of the plurality of strip-shaped adhesive tapes 5 is less than or equal to a length of the edge.

In this embodiment, the distance between any two adjacent ones of the plurality of strip-like adhesive tapes 5 is equal, which facilitate to install light sources with a same specification to achieve a uniform light mixing effect and form evenly distributed gaps between the light sources to facilitate heat dissipation.

In this embodiment, a distance between any two adjacent ones of the plurality of strip-like adhesive strips 5 is greater than the width of the strip-shaped adhesive strips 5. Wide spacing helps to increase a width of the heat dissipation gaps, further enhancing the heat dissipation efficiency of the backlight structure. Further, in the present embodiment, the strip-shaped adhesive tapes 5 have a certain thickness for fixing the light sources. Preferably, the strip-shaped adhesive tapes 5 has a thickness less than or equal to the height of the light source.

The light sources are consisted of a plurality of light strips disposed in parallel. Specifically, a number of the light strips is same as the number of the strip-shaped adhesive tapes. In the embodiment, the number of the light strips is three. Each of the strips includes a plurality of individual point light sources 7. Specifically, each of the strips includes three separate point light sources 7. The light strips have a same structure and size and are disposed in one-to-one correspondence with the plurality of strip-shaped adhesive tapes 5. The plurality of independent point light sources 7 have a same structure and size and are equally spaced apart in the light strips to get a more uniform light mixing effect.

In the present embodiment, the plurality of point light sources 7 are fixed to the backboard 4 by the plurality of bonding units 5. An area of a projection of the bonding point corresponding to a point light source on the backboard is less than or equal to an area of a projection of the point light source on the backboard. Such an arrangement can effectively increase the heat dissipation efficiency of the point light source 7.

In the existing backlight structure, referring to FIG. 1, an entire surface of the point light sources 7 is covered by the bonding units 5. The heat generated by the point light sources 7 is limited to a sealed structure composed by the bonding units 5 and the backboard 2 and is difficult to diverge. In this embodiment, an area of a projection of the bonding point corresponding to a point light source on the backboard is less than or equal to an area of a projection of the point light source on the backboard. Therefore, when the point light sources 7 are embedded in the bonding units 5, at least a part of a side surface of the point light sources 7 is exposed outside the bonding units 5 and in direct contact with the air. The heat generated by the point light sources 7 can be dissipated in time, thereby greatly improving the heat dissipation efficiency of the backlight structure.

Referring to FIG. 7, a length of the light strips is less than or equal to a length of the strip-shaped adhesive tapes 5, and a minimum width of the point light sources of each of the light strips is greater than the width of the strip-shaped adhesive tape 5. This arrangement makes it impossible for the strip-shaped adhesive tapes 5 to cover the entire surface of the point light sources 7, at least a part of the side surface of the point light sources is disposed outside the strip-shaped adhesive tapes 5, thereby improving heat dissipation efficiency.

In the present invention, the point light sources 7 can be a cuboid, a cylinder, a sphere or other alternative geometry. Referring to FIG. 6 to FIG. 10, in the present embodiment, the plurality of point light sources 7 are cuboids, and at least two surfaces of the cuboids are exposed outside the bonding units 5. The two surfaces exposed on the outside can directly exchange heat with the external environment, thereby increases the heat dissipation efficiency of the light source.

Figure 12:
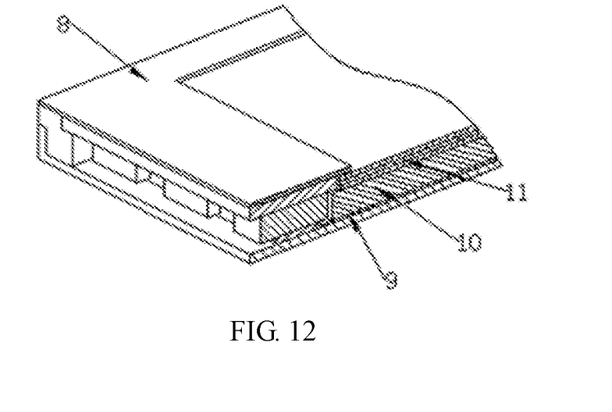
FIG. 12 is an overall structural diagram of a backlight structure in an embodiment of the present invention.

Referring to FIG. 12, the backlight structure further includes other optical film groups such as a reflective plate 9, a light guide plate 10, a film 11, and a mouth-shaped glue 8.

Figure 11:
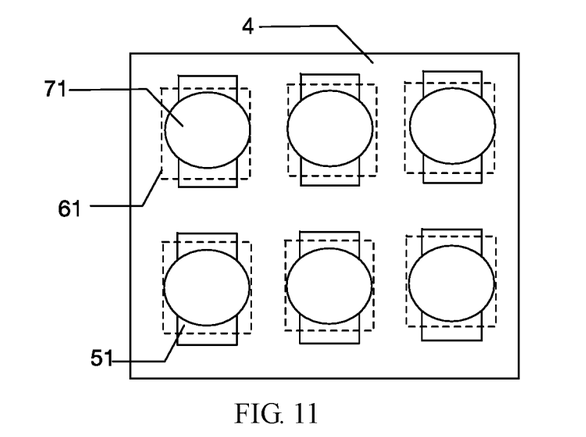
FIG. 11 is a diagram of a projection of a backlight structure on a horizontal plane in a third embodiment of the present invention.

In other embodiments, the bonding units are consisted of a plurality of independent bonding points, the light sources are consisted of a plurality of independent point light sources, the plurality of bonding points and the plurality of point light sources are in one-to-one correspondence. Specifically, referring to FIG. 11, FIG. 11 is a schematic diagram of a projection of a backlight structure on a horizontal plane in a third embodiment of the present invention. The bonding units are a plurality of independently distributed bonding points 51, and the plurality of light sources are independent point light sources 71 that are in one-to-one correspondence with the plurality of bonding points 51.

In this embodiment, a shape of each of the point light sources 71 is a cylinder. The projected area of each of the point light sources 71 on the backboard 4 is larger than the projected area of the bonding points 51 corresponding to the point light sources 71 on the backboard 4. Preferably, the plurality of point light sources 71 are evenly distributed on the backboard 4. The distance between the geometric centers of any two adjacent point light sources 71 is equal. In this embodiment, the plurality of bonding points 51 are regularly arranged in an array, and gaps between any two adjacent bonding points 51 are combined to form a regular cross-distributed path for air circulation. Compared with the parallel path between the strip-shaped adhesive tapes 5 disposed in parallel in FIG. 9, the cross-distributed path has a higher air circulation efficiency and contribute to heat dissipation.

Accordingly, the present invention also provides a LCD panel including the backlight structure as described above.

Accordingly, the present invention also provides an electronic device including the LCD panel with a backlight structure as described above.

As is understood by persons skilled in the art, the foregoing preferred embodiments of the present disclosure are illustrative rather than limiting of the present disclosure. It is intended that they cover various modifications and that similar arrangements be included in the spirit and scope of the present disclosure, the scope of which should be accorded the broadest interpretation so as to encompass all such modifications and similar structures.

What is claimed is:

1. A backlight structure, wherein the backlight structure comprises:
    a backboard;
    a plurality of bonding units spaced apart on the backboard;
    a plurality of light sources fixed to the backboard by the plurality of bonding units;
    wherein an area of a projection of a contact surface between the light sources and the bonding units on the backboard is less than or equal to an area of a projection of the light sources on the backboard; and
    a support portion vertical to the backboard is provided adjacent to the light sources.

2. The backlight structure according to claim 1, wherein the bonding units are consisted of a plurality of strip-shaped adhesive tapes;
    wherein the plurality of strip-shaped adhesive tapes are arranged in parallel, a length direction of the plurality of strip-shaped adhesive tapes is parallel to an edge of the backboard, and a length of the plurality of strip-shaped adhesive tapes is less than or equal to a length of the edge.

3. The backlight structure according to claim 2, wherein distances between any two adjacent strip-shaped adhesive tapes are equal, and the distance between any two adjacent strip-shaped adhesive tapes is greater than a width of the strip-shaped adhesive tape.

4. The backlight structure according to claim 2, wherein the light sources are consisted of a plurality of light strips disposed in parallel, each of the light strips comprising a plurality of independent point light sources.

5. The backlight structure according to claim 4, wherein the light strips have a same structure and size, and are disposed in one-to-one correspondence with the strip-shaped adhesive tapes,
    wherein a length of the light strips is less than or equal to a length of the strip-shaped adhesive tapes, and a minimum width of the point light sources of each of the light strips is greater than the width of the strip-shaped adhesive tape.

6. The backlight structure according to claim 1, wherein the bonding units are consisted of a plurality of independent bonding points, the light sources are consisted of a plurality of independent point light sources, the plurality of bonding points and the plurality of point light sources are in one-to-one correspondence.

7. The backlight structure according to claim 6, wherein an area of a projection of the bonding point corresponding to a point light source on the backboard is less than or equal to an area of a projection of the point light source on the backboard.

8. The backlight structure according to claim 6, wherein the point light sources are evenly distributed on the backboard;
    wherein a distance between geometric centers of any two adjacent point light sources is equal.

9. A liquid crystal display (LCD) panel comprising a backlight structure, wherein the backlight structure comprises:
    a backboard;

a plurality of bonding units spaced apart on the backboard;

a plurality of light sources fixed to the backboard by the plurality of bonding units;

wherein an area of a projection of a contact surface between the light sources and the bonding units on the backboard is less than or equal to an area of a projection of the light sources on the backboard; and a support portion vertical to the backboard is provided adjacent to the light sources.

10. The LCD panel according to claim 9, wherein the bonding units are consisted of a plurality of strip-shaped adhesive tapes;

wherein the plurality of strip-shaped adhesive tapes are arranged in parallel, a length direction of the plurality of strip-shaped adhesive tapes is parallel to an edge of the backboard, and a length of the plurality of strip-shaped adhesive tapes is less than or equal to a length of the edge.

11. The LCD panel according to claim 10, wherein distances between any two adjacent strip-shaped adhesive tapes are equal, and the distance between any two adjacent strip-shaped adhesive tapes is greater than a width of the strip-shaped adhesive tape.

12. The LCD panel according to claim 10, wherein the light sources are consisted of a plurality of light strips disposed in parallel, each of the light strips comprising a plurality of independent point light sources.

13. The LCD panel according to claim 12, wherein the light strips have a same structure and size, and are disposed in one-to-one correspondence with the strip-shaped adhesive tapes, wherein a length of the light strips is less than or equal to a length of the strip-shaped adhesive tapes, and a minimum width of the point light sources of each of the light strips is greater than the width of the strip-shaped adhesive tape.

14. The LCD panel according to claim 9, wherein the bonding units are consisted of a plurality of independent bonding points, the light sources are consisted of a plurality of independent point light sources, the plurality of bonding points and the plurality of point light sources are in one-to-one correspondence.

15. The LCD panel according to claim 14, wherein an area of a projection of the bonding point corresponding to a point light source on the backboard is less than or equal to an area of a projection of the point light source on the backboard.

16. The LCD panel according to claim 14, wherein the point light sources are evenly distributed on the backboard;

wherein a distance between geometric centers of any two adjacent point light sources is equal.

17. An electronic device comprising a liquid crystal display (LCD) panel, wherein the LCD panel comprises a backlight structure, and the backlight structure comprises:

a backboard;

a plurality of bonding units spaced apart on the backboard;

a plurality of light sources fixed to the backboard by the plurality of bonding units;

wherein an area of a projection of a contact surface between the light sources and the bonding units on the backboard is less than or equal to an area of a projection of the light sources on the backboard; and a support portion vertical to the backboard is provided adjacent to the light sources.

* * * * *